US008000006B2

(12) United States Patent
Perotti et al.

(10) Patent No.: US 8,000,006 B2
(45) Date of Patent: Aug. 16, 2011

(54) REAR-PROJECTION SCREEN

(75) Inventors: Daniel Perotti, Dampremy (BE); Guy Siraux, Gognies Chaussée (FR)

(73) Assignee: Morgan Adhesives Company, Stow, OH (US)

( * ) Notice: Subject to any disclaimer, the term of this patent is extended or adjusted under 35 U.S.C. 154(b) by 82 days.

(21) Appl. No.: 12/496,793

(22) Filed: Jul. 2, 2009

(65) Prior Publication Data

US 2011/0002036 A1    Jan. 6, 2011

(51) Int. Cl.
G03B 21/56 (2006.01)
G03B 21/60 (2006.01)

(52) U.S. Cl. ................. 359/443; 359/449; 359/460

(58) Field of Classification Search .......... 359/452–453, 359/443, 460, 449
See application file for complete search history.

(56) References Cited

U.S. PATENT DOCUMENTS

| | | | |
|---|---|---|---|
| 3,655,262 A | 4/1972 | DePalma | |
| 3,682,530 A | 8/1972 | De Palma et al. | |
| RE28,516 E | 8/1975 | Lu et al. | |
| 4,053,208 A | 10/1977 | Kato et al. | |
| 4,083,626 A | 4/1978 | Miyahara et al. | |
| 4,573,764 A | 3/1986 | Bradley | |
| 4,666,248 A | 5/1987 | van de Ven | |
| 5,361,164 A * | 11/1994 | Steliga | 359/455 |
| 5,456,967 A * | 10/1995 | Nezu | 428/141 |
| 6,204,971 B1 | 3/2001 | Morris et al. | |
| 6,411,436 B1 * | 6/2002 | Kikuchi | 359/460 |
| 6,556,347 B1 * | 4/2003 | Murayama et al. | 359/453 |
| RE38,245 E | 9/2003 | Morris et al. | |
| 6,727,313 B2 | 4/2004 | Zhou et al. | |
| 6,765,720 B2 | 7/2004 | Morris et al. | |
| 6,819,486 B2 | 11/2004 | Ma et al. | |
| 6,870,670 B2 | 3/2005 | Gehring et al. | |
| 6,940,643 B2 | 9/2005 | Ma et al. | |
| 7,050,227 B2 | 5/2006 | Olofson et al. | |
| 7,142,361 B2 | 11/2006 | Olofson et al. | |
| 7,229,684 B2 | 6/2007 | Enniss et al. | |
| 7,417,794 B2 * | 8/2008 | Browning | 359/452 |
| 7,609,443 B2 * | 10/2009 | Bertin-Mourot et al. | 359/452 |
| 2002/0163722 A1 * | 11/2002 | Gehring et al. | 359/460 |
| 2003/0076582 A1 | 4/2003 | Phillips et al. | |
| 2006/0056022 A1 * | 3/2006 | Yeo et al. | 359/460 |

(Continued)

FOREIGN PATENT DOCUMENTS

EP    0 114 406    8/1984

(Continued)

OTHER PUBLICATIONS http://en.wikipedia.org/wiki/Absorbance printed Dec. 16, 2010.*

Primary Examiner — Christopher Mahoney
(74) Attorney, Agent, or Firm — Tom J. Hall

(57) ABSTRACT

The present invention is directed to a rear-projection screen which encompasses 1) a flexible light-diffusive first film having a substantially smooth first surface and an opposing substantially smooth second surface, and comprising a wax-free amorphous thermoplastic matrix having a plurality of light-diffusing particles dispersed therein and which is lens-free; and 2) an opposing flexible light-absorption second film having a first surface and an opposing second surface, and comprising a thermoplastic matrix having a plurality of light-absorbing particles dispersed therein, wherein the first and second films are adapted to be 3) bonded together in direct contact with each other and then, affixed as a laminate to one or more transparent rigid substrates or 4) affixed individually to a transparent rigid substrate.

83 Claims, 9 Drawing Sheets

| U.S. PATENT DOCUMENTS | | |
|---|---|---|
| 2006/0061861 A1 | 3/2006 | Munro et al. |
| 2007/0201131 A1 | 8/2007 | Katsura |
| 2008/0231815 A1 | 9/2008 | Ganzevoort |
| 2008/0238317 A1 | 10/2008 | Kwon et al. |
| 2008/0304018 A1 | 12/2008 | Tanis-Likkel et al. |
| 2009/0004478 A1 | 1/2009 | Baetzold et al. |

| FOREIGN PATENT DOCUMENTS | | |
|---|---|---|
| EP | 0 148 529 | 7/1985 |
| EP | 0 770 902 | 5/1997 |
| GB | 2 022 861 A | 12/1979 |
| WO | WO 02/076764 | 10/2002 |

\* cited by examiner

REAR-PROJECTION SCREEN

TECHNICAL FIELD

This invention relates to a rear-projection screen and in particular a rear-projection screen having at least two layers which enhances the image-contrast of a projected image and reduces the effect of ambient light.

BACKGROUND OF THE INVENTION

Rear-projection screens are utilized for various applications, such as, for example, advertising in store windows, show rooms, exhibitions, shopping malls, lobbies, restaurants, museums and various transportation stations. In such applications, an image source located behind the screen projects image light forward along a projection axis toward the screen to form a visible image at the plane of the screen which is distributed to viewers on both the receiving or rear side of the screen and the opposing, front side of the screen. Typical screen characteristics used to describe a screen's performance include contrast, image brightness, visible light transmittance, visible light absorbance and visible light reflectance.

It is generally desirable to have a rear-projection screen where the image is visible on both the front and rear surfaces and that has high image contrast and high image brightness in daylight and at night. Unfortunately, as one screen characteristic is improved, one or more other screen characteristics often degrade. For example, image contrast can be somewhat improved by incorporating a light-absorbing materials and/or light-diffusing elements in the screen for redirecting the ambient light. Often when the reflected ambient light is reduced by this technique, image brightness on one or both surfaces is also reduced because the screen has become more opaque. As a result, there is little or no effective gain in the image quality. For this reason, certain tradeoffs are made in screen characteristics and performance in order to produce a screen that has acceptable overall performance for the particular rear-projection display application. Display applications intended to be viewable on a window from both the interior and exterior of a building are particularly challenging to manufacturers since that the relative amount of sunlight reflected from the window is much greater than the ambient light reflected inside of the building.

BRIEF SUMMARY OF THE INVENTION

The primary object of the invention is to provide a rear-projection screen having improved image contrast and very little, if any, reflection of sunlight to a viewer located outside of a building. It has been discovered that a rear-projection screen having a visible light transmittance of between 25 to 50% and visible light absorbance of between 35 to 55% would exhibit the desired image contrast.

Another object of the invention is to provide a rear-projection screen having improved image contrast and enhanced image brightness while providing a viewable image to viewers located inside and outside of a building. It has been discovered that a rear-projection screen having a visible light transmittance of between 25 to 50% and visible light absorbance of between 35 to 55% would exhibit the desired image contrast.

Still another object of the invention is to provide a rear-projection screen having improved image contrast and enhanced image brightness which is be easily and temporarily or permanently mountable onto a transparent substrate such as a store window for viewing of a projected image inside and outside of a building.

Still yet another object of the invention is to provide a rear-projection screen that is both relatively inexpensive to manufacture and very high quality, and meets all of the requirements set out above for an improved rear-projection screen.

The above objects and advantages of the invention are attained by a rear-projection screen which encompasses 1) a flexible light-diffusive first film having a substantially smooth first surface and an opposing substantially smooth second surface, and comprising a wax-free amorphous thermoplastic matrix having a plurality of light-diffusing particles dispersed therein and which is lens-free; and 2) an opposing flexible light-absorption second film having a first surface and an opposing second surface, and comprising a thermoplastic matrix having a plurality of light-absorbing particles dispersed therein, wherein the first and second films are adapted to be 3) bonded together in direct contact with each other and then, affixed as a laminate to one or more transparent rigid substrates or 4) affixed individually to a transparent rigid substrate.

BRIEF DESCRIPTION OF SEVERAL VIEWS OF THE DRAWINGS

Reference is now made to the accompanying drawings wherein like reference numerals designate like parts and wherein.

DETAILED DESCRIPTION

Figure 1A:
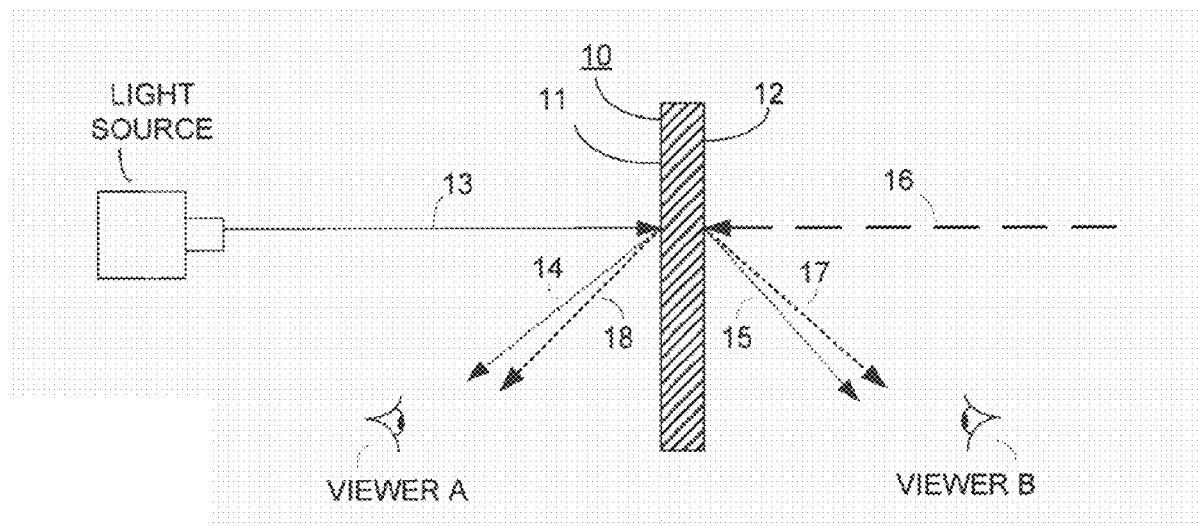
FIG. 1a and 1b are enlarged sectional views through a conventional diffusion-type rear-projection screen having light scattering particles embedded therein and showing the effect of the sunlight incident on the viewing surface thereof.

The term "lens-free" as used herein refers to light-diffusive films which do not include the following: any repeating geometric structure, such as, for example, trough-like and post-like features, embedded within the film or on the surface of the screen, which focuses or defocuses light passing through it; Fresnel lens; lenticular lens; and any other optically transparent device which focuses or defocuses light passing through it. Rear-projection screen utilizing the aforementioned lens for light diffusion are known in the art and have been described for example, in U.S. Pat. Nos. 3,832,032; 4,003,080; 4,573,764; 4,666,248; 7,142,361; 6,204,971; 6,765,720 and RE38,245, the disclosures of which are incorporated herein by reference in their entireties. U.S. Pat. No. 3,832,032 describes a transparent projection screen comprising Fresnel lenses which faces the primary image-source. U.S. Pat. Nos. 4,003,080 and 4,666,248 describe a rear-projection screen comprising a single sheet which at its back carries a multitude of lens elements arranged in a two dimensional matrix. U.S. Patent No. discloses a rear-projection screen which uses a front surface lenticular array to distribute projected light. U.S. Pat. No. 7,142,361 describes microstructured protrusions and indentions arranged internally in a multilayered projection screen. U.S. Pat. Nos. 6,204,971; 6,765,720 and RE38,245 each describe an array of closely packed glass microspheres or beads on a film surface for use in a rear-projection screen.

As used herein, the term "thermoplastic" refers to a polymer or polymer mixture that softens when exposed to heat and returns to its original condition when cooled to room temperature. In general, thermoplastic materials include, but are not limited too, synthetic polymers such as polyolefins, polyesters, vinyl acetate copolymers, and the like. Thermoplastic materials may also include any synthetic polymer that is cross-linked by either radiation or chemical reaction during a manufacturing process operation. The term "amorphous" refers to thermoplastic polymer or copolymer with an absence of a regular three-dimensional arrangement of molecules or subunits of molecules extending over distances, which are large relative to atomic dimensions. However, regularity of structure exists on a local scale. See, "Amorphous Polymers," in *Encyclopedia of Polymer Science and Engineering*, 2nd Ed., pp. 789-842 (J. Wiley & Sons, Inc. 1985). This document has a Library of Congress Catalogue Card Number of 84-19713. In particular, the term "amorphous" as used with respect to the present invention refers to a material recognized by one skilled in the art of differential scanning calorimetry (DSC) as having no measurable melting point (less than 0.5 cal/g) or no heat of fusion as measured by DSC using ASTM 3417-83. The term "polymer" refers to the product of a polymerization reaction, and is inclusive of homopolymers, copolymers, terpolymers, etc. In general, the layers of a film as used herein can consist essentially of a single polymer, or can have still additional polymers together therewith, i.e., blended therewith. Particularly suitable amorphous thermoplastic polymer or copolymer for use in the present invention includes, but is not limited to, polyolefins, polyesters, and polyvinyl chlorides.

"Polyolefin" refers to homopolymers, copolymers, including e.g. bipolymers, terpolymers, etc., having a methylene linkage between monomer units which may be formed by any method known to those skilled in the art. Suitable examples of polyolefins include polyethylene, low density polyethylene, linear low density polyethylene, very low density polyethylene, ultra low density polyethylene, medium density polyethylene, high density polyethylene, polyethylenes comprising copolymers of ethylene with one or more alpha-olefins (a-olefins) such as butene-1, hexene-1, octene-1, or the like as a comonomer, linear low density polyethylene, very low density polyethylene, ultra low density polyethylene, ethylene/propylene copolymers, polypropylene, propylene/ethylene copolymer, polyisoprene, polybutylene, polybutene, poly-3-methylbutene-1, poly-4-methylpentene-1, ionomers and the like.

"Polyester" refers to homopolymers or copolymers having an ester linkage between monomer units which may be formed, for example, by condensation polymerization reactions between a dicarboxylic acid and a glycol. The dicarboxylic acid may be linear or aliphatic, i.e., oxalic acid, malonic acid, succinic acid, glutaric acid, adipic acid, pimelic acid, suberic acid, azelaic acid, sebacic acid, and the like; or may be aromatic or alkyl substituted aromatic, i.e., various isomers of phthalic acid, such as paraphthalic acid (or terephthalic acid), isophthalic acid and naphthalic acid. Specific examples of alkyl substituted aromatic acids include the various isomers of dimethylphthalic acid, such as dimethylisophthalic acid, dimethylorthophthalic acid, dimethylterephthalic acid, the various isomers of diethylphthalic acid, such as diethylisophthalic acid, diethylorthophthalic acid, the various isomers of dimethyinaphthalic acid, such as 2,6-dimethylnaphthalic acid and 2,5-dimethylnaphthalic acid, and the various isomers of diethyinaphthalic acid. The glycols may be straight-chained or branched. Specific examples include ethylene glycol, propylene glycol, trimethylene glycol, 1,4-butane diol, neopentyl glycol and the like. In one example a preferred embodiment of this invention, the first layer comprises polyethylene terephthalate copolymer and most preferable, biaxially-oriented polyethylene terephthalate copolymer.

"Polyvinyl chloride" commonly abbreviated PVC refers to homopolymers or copolymers having at least a vinyl chloride repeating unit within the polymer backbone. Polyvinyl chloride may be formed, for example, by free-radical polymerization a vinyl chloride monomer. PVC is similar to polyethylene, but on every other carbon in the backbone chain, one of the hydrogen atoms is replaced with a chlorine atom.

The amorphous thermoplastic matrix of the present invention is not, of course, limited to any of the examples provided above. Preferred embodiments of the present invention have a light-diffusive film and light-absorption film where each includes a thermoplastic matrix comprising polyolefin, particularly, polyethylene and polypropylene, polyester or polyvinyl chloride matrix. In a more preferred embodiment of the present invention, the both the light-diffusive film and light-absorption film comprising a thermoplastic matrix that includes polyvinyl chloride.

According to the present invention, the light-diffusive film is a lens-free, flexible monolayer or multilayer film having a substantially smooth first surface and an opposing substantially smooth second surface and comprises a wax-free amorphous thermoplastic matrix having a plurality of light-diffusing particle dispersed therein. The light-diffusive film according to the present invention will exhibit a visible light transmittance of between 60 to 80% and a visible light absorbance of between 0 to 15% as measured in accordance with European Norms EN410 test procedures. Generally, the light-diffusive layer will have a milky or frosted translucent appearance. The wax-free amorphous thermoplastic matrix is obtained by molding the material along with the desired amount of light-diffusing particles into a sheet-like form by methods known in the art which include, but are not limited to, for example, calendaring, extrusion, co-extrusion, injection molding, etc. The light diffusion capability of the light-diffusive film can be controlled by the selection of thermoplastic matrix material and light-diffusing particles, and the relative amounts of the light-diffusing particles present in the film.

The light-diffusing particles according to the present invention may include, but are not limited to, for example, organic particles, such as styrene resin particles, silicone resin articles, acrylic resin particles, and methacryl-styrene copolymer particles, inorganic particles, such as barium sulfate, calcium carbonate particles, silicon dioxide particles and the like, and metallic particles, such as aluminum and aluminum hydroxide, titanium oxide and the like. The light-diffusing particles of the present invention preferably include inorganic particles or inorganic particles and metallic particles, more preferably include barium sulfate particles, and most preferably include barium sulfate particles and aluminum particles. The light-diffusing particles may be dispersed in the light-diffusive film in any amount desired. A preferred amount of barium sulfate particles dispersed in the light-diffusive film is between 15 to 20% by weight relative to the entire weight of the layer. The preferred amount of aluminum particles present in the light-diffusive layer is preferably between 0 to 1.0% and more preferably, between 0.4 to 0.8% by weight relative to the entire weight of the layer. The thickness of the light-diffusive film is not particularly restricted, however a preferred range of thickness is between 25 to 250 microns, more preferably between 40 to 150 microns, and most preferably, between 50 to 100 microns.

The rear-projection screen according to the present invention is preferably constructed such that the light-diffusive film is an image receiving surface. Examples of suitable light-diffusive films for use in the present invention include those sold under the following trademarks and trade names: MACal® Glass Décor 700 series of films which are commercially available from MACtac Europe SA, Soignies, Belgium; Multi-fix series 5600 films which are commercially available from Multi-fix NV, Genk, Belgium; Hexis® S 5DP series of films which are commercially available from Hexis SA, Frontignan, France; and Avery® Dusted Glass Film which is commercially available from Avery Dennison Company, Graphics Division, Hazerswoude, The Netherlands.

According to the present invention, the light-absorption film is a flexible monolayer or multilayer film having a first surface and an opposing second surface and comprises an amorphous thermoplastic matrix having a plurality of light-absorbing particle dispersed therein. A light-absorption film according to the present invention will exhibit a visible light transmittance of between 35 to 60% and a visible light absorbance of between 40 to 60% as measured in accordance with European Norms EN410 test procedures. Generally, the light-absorption layer will be a colored transparent film.

The light-absorbing particles according to the present invention are any material that can absorb light uniformly and/or selectively and may include, for example, any organic or inorganic colorants or pigments. The term "colorant" refers to any particulate material which exhibits hue, chroma and/or value and may include any conventional colorant such as, for example, Toluidine Blue, Brillant Acid Blue, Cyanine Blue, First Light Red, Super Chrome Yellow, Ethyl Orange and others such as Titanium oxide, carbon black, cadmium red, barium yellow, cobalt green, manganese violet and other inorganic pigments, such as, Vulcan Orange, Lake Red, and azo pigments, nitroso pigments, nitro pigments, basic dye Lakes, acidic dye Lakes, phthalocyanine pigments, fluorescent pigments, etc. The light-absorbing particles used are not, of course, limited to the above and may be added to and dispersed into the thermoplastic matrix by the same manner as described above for the light-diffusing particles of the light-diffusive film. The light-absorbing particles preferably include carbon black particles, graphite particles, metal salt particles, such as black iron oxide particles, colored organic particles and colored glass beads, and more preferably, carbon black particles. The light-absorbing particles may be dispersed in the light-absorption film in any amount desired. The preferred amount of carbon black particles present in the light-absorption film is between 0.05 to 0.5% and more preferably between 0.05 to 0.3% by weight relative to the entire weight of the layer. The light absorption capability of the light-absorption film can be controlled by the selection of thermoplastic matrix material and light-absorbing particles, and the relative amounts of the light-absorbing particles present in the film. The thickness of the light-absorption film is not particularly restricted, however a preferred range of thickness is between 25 to 250 microns, more preferably between 40 to 150 microns, and most preferably, between 50 to 100 microns.

The rear-projection screen according to the present invention is preferably constructed such that the light-diffusive film is an ambient light or sunlight receiving surface. Examples of suitable light-diffusive films for use in the present invention include those sold under the following trademarks and trade names: Hexis® AUTO 20 CH and AUTO 35 CH series of films which are commercially available from Hexis SA, Frontignan, France; Solar Zone Alpha 36 films which are commercially available from Hanita Coatings, Kibbutz Hanita, Israel; 3M Scotchtint™ FX series of films which are commercially available from 3M Company, St Paul, Minn., U.S.A.; and Llumar Solar Control Films which are commercially available from CPFilms, Inc., Martinsville, Va., U.S.A.

Although specific embodiments of the present invention will now be described with reference to the drawings, it should be understood that such embodiments are by way of example only and merely illustrative of but a small number of the many possible specific embodiments which can represent applications of the principles of the present invention.

Figure 1B:
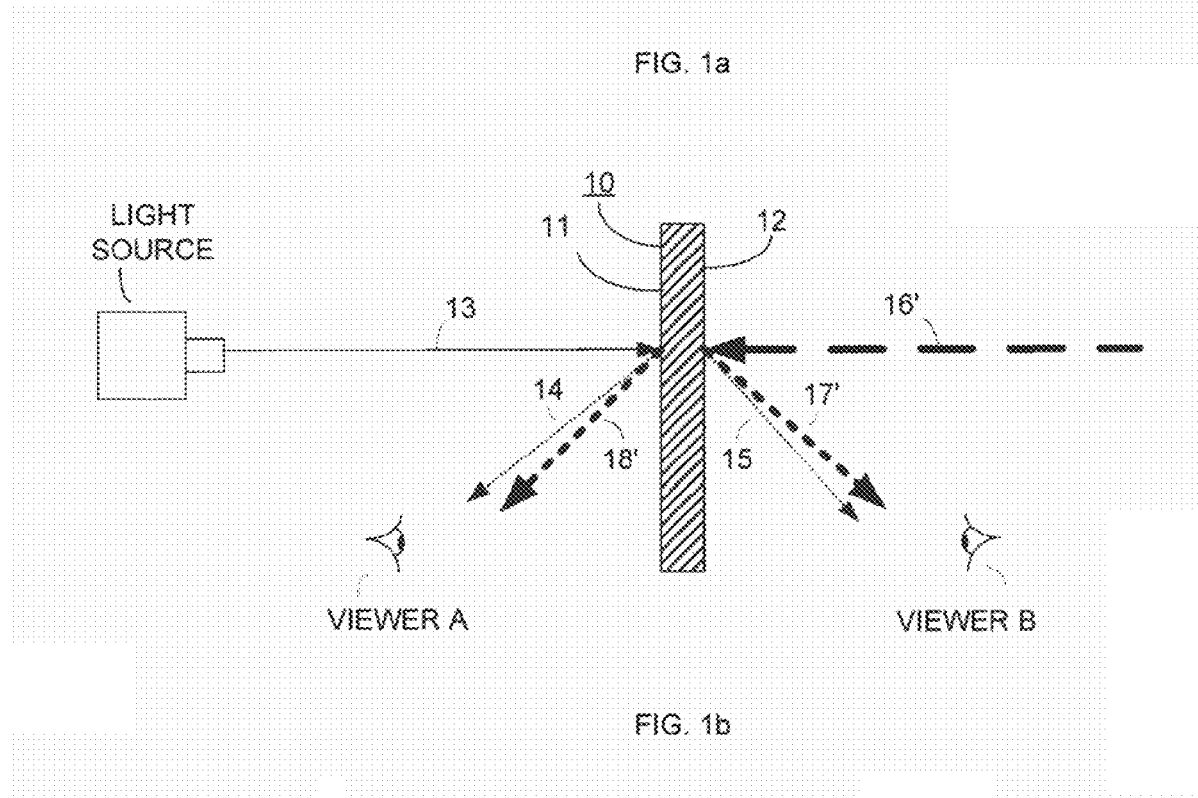

A conventional light-diffusive type rear-projection screen 10 is illustrated in FIGS. 1a and 1b having an image receiving surface (or rear viewing surface) 11 and a front viewing (or ambient light or sunlight receiving) surface 12. As shown by the arrows 13, the projected image light from a light source or projector is incident on the image receiving surface 11 of the screen and observer A views the reflected image designated by dotted-line arrows 14 from surface 11. At the same time, observer B views the transmitted image designated by dotted-line arrows 15 as it passes through the screen onto surface 12. In FIG. 1a, ambient light, typically present inside of a building, is shown by the dashed-line arrow 16, with the arrow indicating the direction of the incident light. The manner in which such ambient light can be reflected from the surface 12 before it enters screen 10 is designated schematically by the weighted dotted-line arrow 17. A small portion of the reflected ambient light 17 will be directed from surface 12 towards observer B and will cause some obscuring of the transmitted image 15. A small portion of the ambient light incident on the viewing surface 12 is diffused or refracted upon entry into screen 10 and is scattered within the screen. A portion of this ambient light is then transmitted through screen 10 and is directed back towards the observer A as designated by weighted dotted-line arrow 18. This portion of ambient light 18 will cause some interference with the viewing of the reflected image 14 by observer A. In FIG. 1b, sunlight, typically present outside of a building, is shown by the weighted dashed-line arrow 16', with the arrow indicating the direction of the incident light. The manner in which such sunlight can be reflected from the surface 12 before it enters screen 10 is designated schematically by the weighted dotted-line arrow 17'. A small portion of the sunlight incident on the viewing surface 12 is diffused or refracted upon entry into screen 10 and is scattered within the screen. A portion of this sunlight is transmitted through the screen to surface 11 and is directed back towards the observer A as designated by weighted dotted-line arrow 18'. As is illustrated, when diffusion-type rear-projection screens are placed on an exterior window or are exposed to sunlight, a relatively large amount of the sunlight returns or reflects back to the observer B, as indicated by weighted dotted-line arrow 17'. This will cause the transmitted image 15 to be more obscured when viewed by observer B. Additionally, a relatively large amount of sunlight passes through the screen and is directed towards observer A, as indicated by the weighted dotted-line arrow 18'. This will also cause the reflected image 14 to be more obscured when viewed by observer A. This results in very poor image quality, particularly with respect to low image contrast for observers on both sides of the rear-projection screen.

Figure 2:
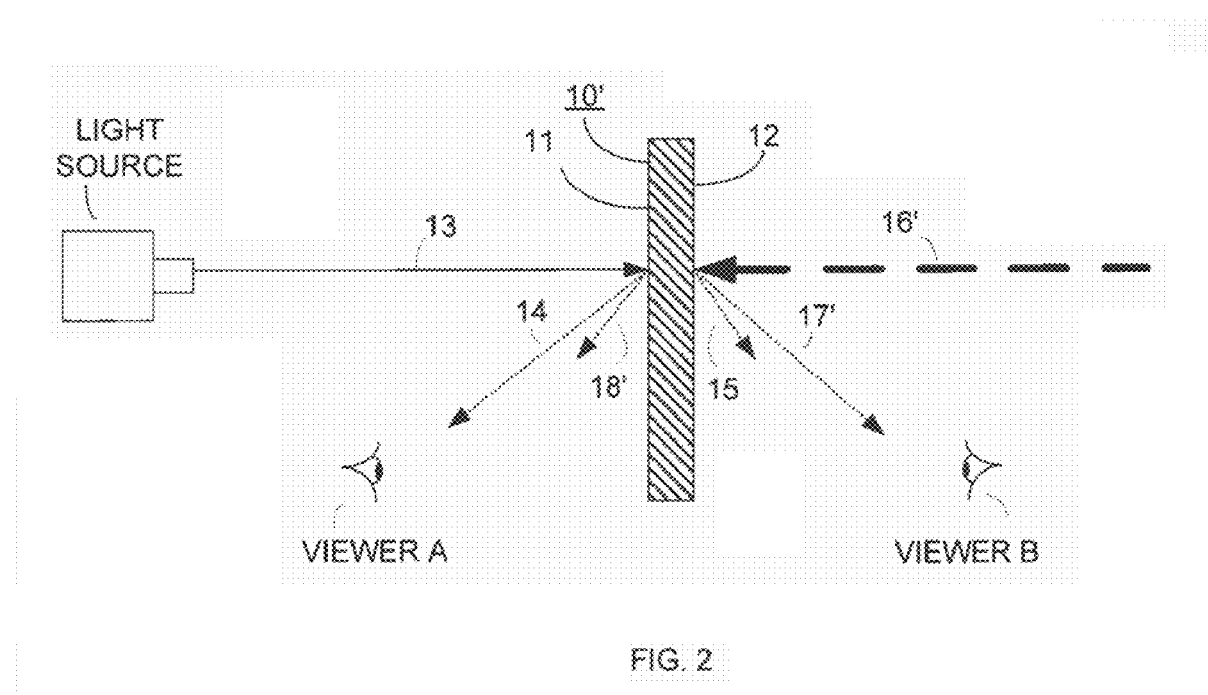
FIG. 2 is enlarged sectional view through a absorption-type rear-projection screen showing the effect of the sunlight incident on the viewing surface thereof.

A conventional light-absorption screen 10' is illustrated in FIG. 2. The projected image light is incident on the image receiving surface 11 of the screen and observer A views the reflected image designated by dotted-line arrows 14 from surface 11. At the same time, observer B views the transmitted image designated by shortened dotted-line arrow 15 as it passes through the screen onto surface 12. Sunlight is shown by the weighted dashed-line arrow 16' with the arrow indicating the direction of the incident light. The manner in which such sunlight can be reflected from the surface 12 before it enters screen 10 is designated schematically by the weighted dotted-line arrow 17'. A portion of the reflected sunlight 17' will be directed from surface 12 towards observer B and will cause some obscuring of the transmitted image 15. A small portion of the sunlight incident on the viewing surface 12 is diffused or refracted upon entry into screen 10' and is scattered within the screen. A portion of this sunlight is then transmitted through screen 10' and is directed back towards the observer A as designated by shortened dotted-line arrow 18'. This portion of sunlight will cause some interference with the viewing of the reflected image 14 by observer A. As is illustrated, when a light-absorption screen is used as a rear-projection screen, a relatively large portion of the projected image light will be absorbed by screen 10'. Consequently, a relatively small amount of image will be transmitted through screen 10' as designated schematically by shortened dotted-line arrow 15. This results in very poor image quality, particularly with respect to low image brightness for observer B.

Figure 3:
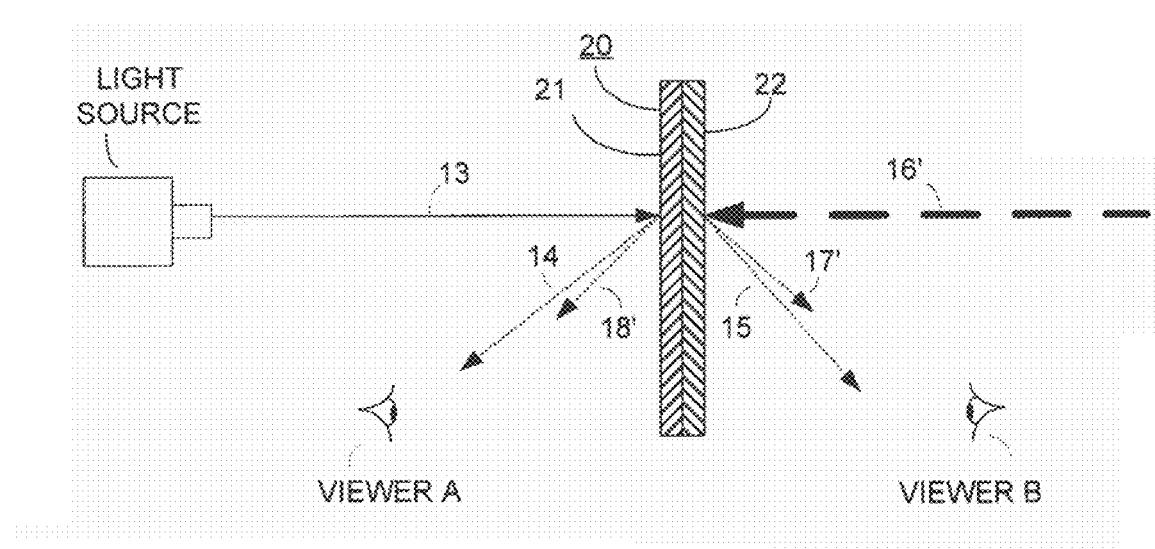
FIG. 3 is a vertical section through a rear-projection screen illustrating one embodiment of the invention having a light-absorption film applied to the image receiving surface or light-diffusive film of the screen, and showing the manner in which sunlight is absorbed by the light-absorbing layer.

The inventive screen 20 shown in FIG. 3 has a light-diffusive film 21 applied to a light-absorption film 22. As depicted, a preferred embodiment of the present invention is shown having the light-diffusive film 21 facing the light source to receive the projected image thereon and the light-absorption film 22 facing sunlight in order to absorb the same. As shown by the arrow 13, the projected image light from a light source is incident on the light-diffusive film 21 and observer A views the reflected image designated by dotted-line arrows 14. At the same time, observer B views the transmitted Image designated by dotted-line arrows 15 as it passes through the screen. Sunlight is shown by the weighted dashed-line arrow 16', with the arrow indicating the direction of the incident light. The manner in which such sunlight can be reflected from the light-absorption film 22 before it enters screen 20 is designated schematically by the shortened dotted-line arrow 17'. As is illustrated, when a rear-projection screen according to the present invention is placed on an exterior window or is exposed to sunlight, a large portion of sunlight is absorbed which results in a relatively small amount of sunlight being both reflected as designated schematically by the shortened dotted-line arrow 17' and transmitted through screen 20. Moreover, there is less reflected sunlight to obscure the transmitted image seen by observer B and less transmitted sunlight to obscure the reflected image seen by observer A. Additionally, when a rear-projection screen according to the present invention is used in this manner, there is no interference of the transmitted image by the light-absorption film through the screen. Consequently, there is improved image contrast and image brightness for observers on both sides of the rear-projection screen 20.

Figure 4A:
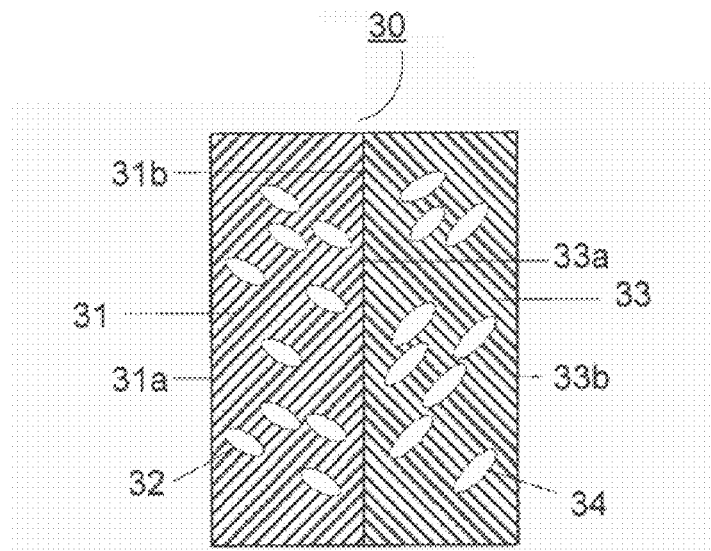
FIGS. 4a and 4b are vertical sections through a rear-projection screen illustrating various embodiments of the light-absorptive film applied to the light-diffusive film of the screen and showing light-diffusing materials in the light-diffusive film and light-absorbing materials in the light-absorptive film.

FIG. 4a shows an enlarged schematic cross-section of one embodiment of the inventive rear-projection screen 30. Screen 30 includes a light-diffusive film 31 and a light-absorption film 33. Film 31 has a first surface 31a and an opposing second surface 31b and includes a plurality of light-diffusing particles 32 embedded and dispersed therein. Film 33 has a first surface 33a and an opposing second surface 33b and includes a plurality of light-absorbing particles 34 embedded and dispersed therein. As illustrated, the second surface 31b of film 31 is affixed to first surface 33a of film 33 which can be accomplished by fusing these surfaces together under heat and pressure.

Figure 4B:
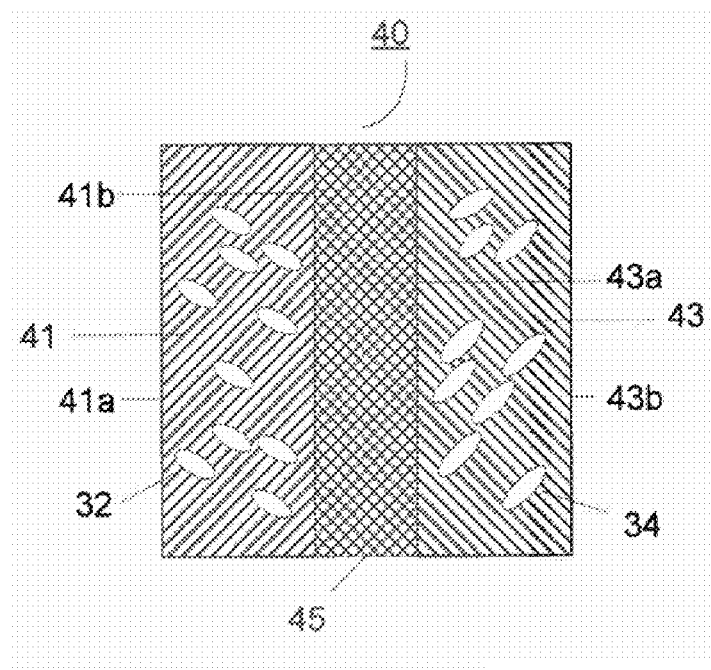

FIG. 4b shows an enlarged schematic cross-section of another embodiment of the inventive rear-projection screen 40. Screen 40 includes a light-diffusive film 31, a light-absorption film 43 and an adhesive 45. Adhesive 45 may comprise any transparent pressure sensitive adhesive and may include a repositionable transparent pressure sensitive adhesive. Preferably, adhesive 45 comprises an acrylic-based transparent pressure sensitive adhesive. Film 41 has a first surface 41a and an opposing second surface 41b and includes a plurality of light-diffusing particles 32 embedded and dispersed therein. Film 43 has a first surface 43a and an opposing second surface 43b and includes a plurality of light-absorbing particles 34 embedded and dispersed therein. As illustrated, adhesive layer 45 joins second surface 41b of film 41 to first surface 33a of film 33.

Figure 5A:
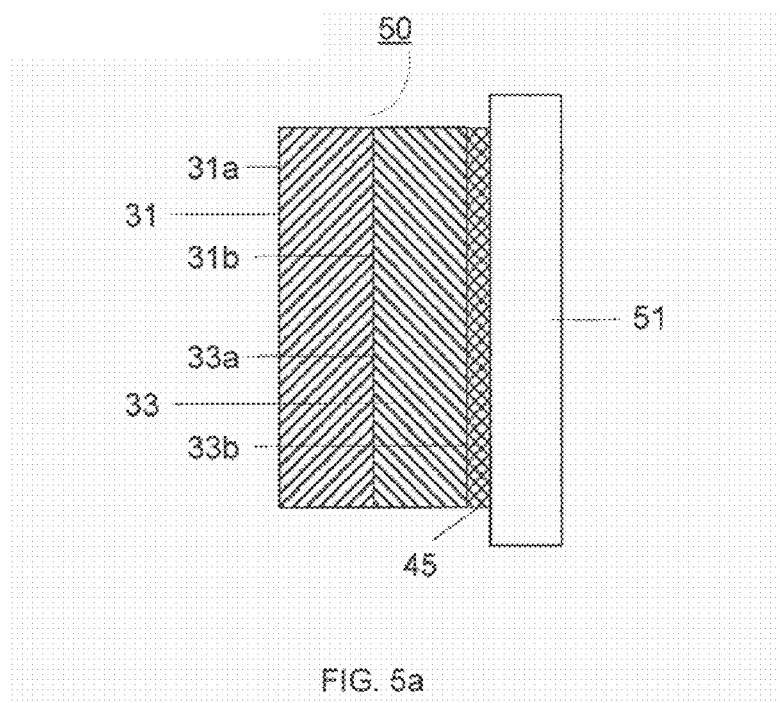
FIGS. 5a and 5b are vertical sections through a rear-projection screen illustrating two embodiments of the invention and showing their relation to a single pane of glass and double panes of glass, respectively.
Figure 5B:
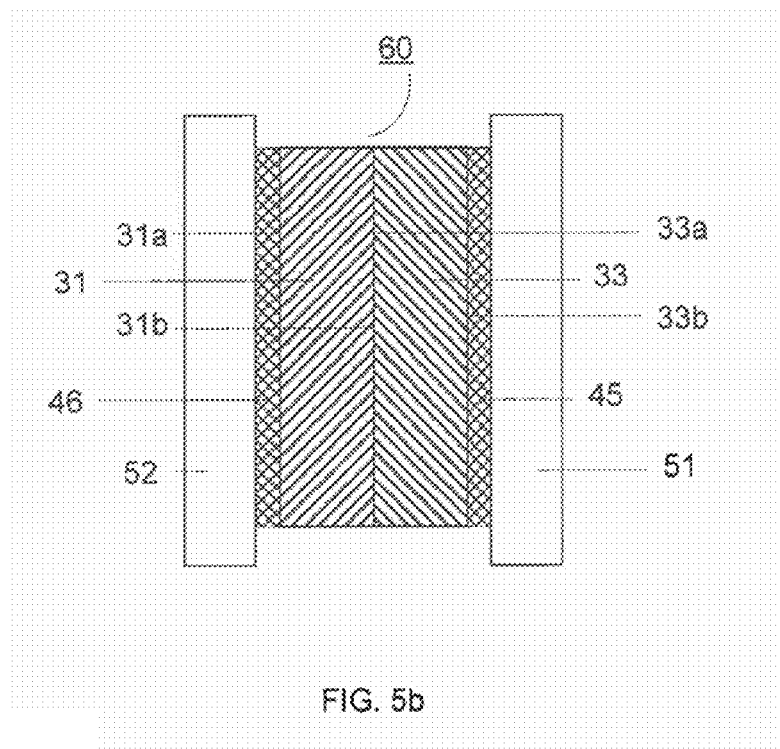

FIGS. 5a and 5b show enlarged schematic cross-sections of embodiments of the inventive rear-projection screen capable of being mounted to the surface of a planar transparent rigid substrate or between two planar transparent rigid substrates. As shown in FIG. 5a, a rear-projection screen 50 may be adapted to be temporarily or permanently mounted to a planar transparent rigid substrate 51 such as, for example, a pane glass. Screen 50 is substantially identical to screen 30 as depicted in FIG. 4a and further includes a transparent pressure sensitive adhesive 45 positioned between the second surface 33b of light-absorption film 33 and rigid substrate 51. FIG. 5b illustrates screen 60 adapted to be permanently mounted between two planar transparent rigid substrates 51 and 52. Screen 60 is substantially identical to screen 50 and further includes a second transparent pressure sensitive adhesive 46 positioned between the first surface 31b of light-diffusive film 31 and rigid substrate 52. It is contemplated that adhesive 46 may be the same or different transparent pressure sensitive adhesive as adhesive 45.

Figure 6A:
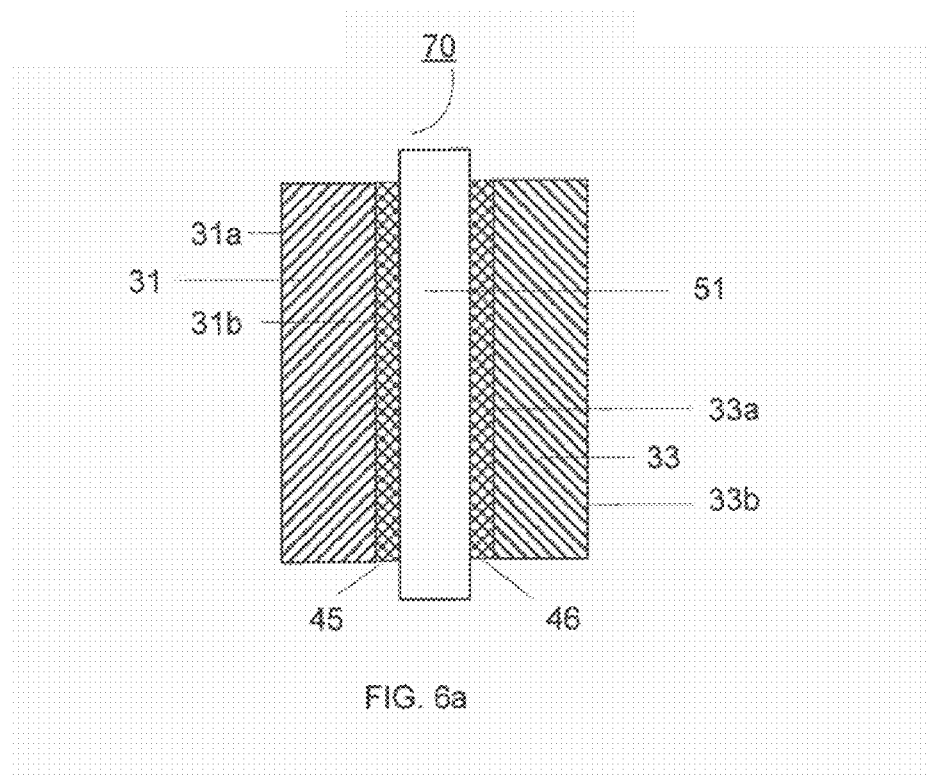
FIGS. 6a and 6b are vertical sections through a rear-projection screen illustrating two additional embodiments of the invention and showing their relation to a single pane of glass and triple panes of glass, respectively.
Figure 6B:
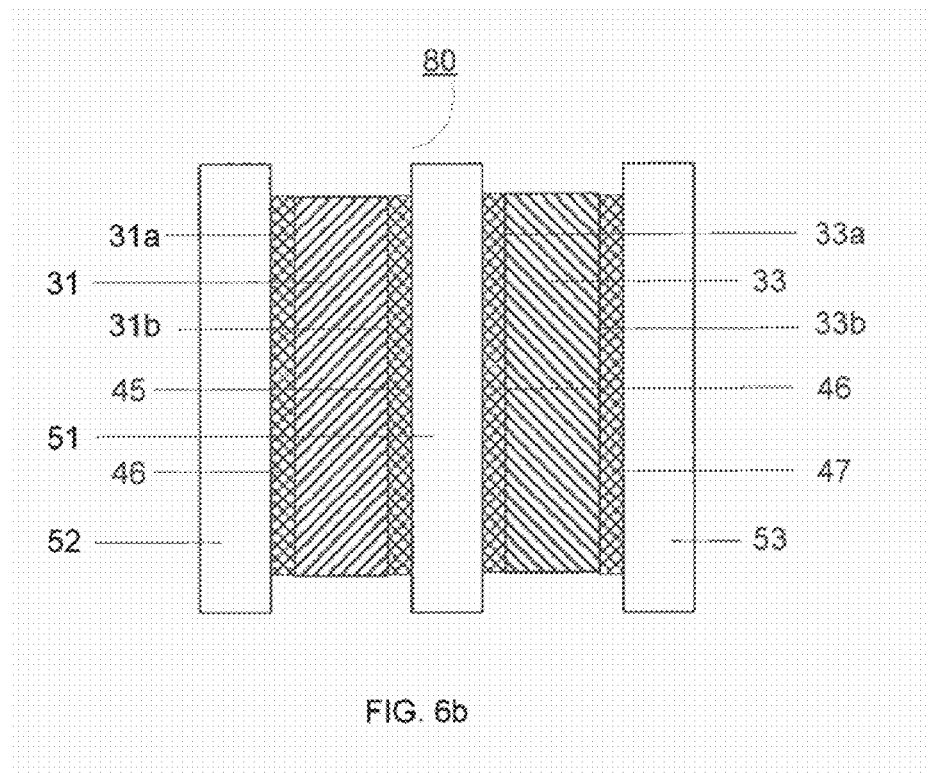

FIGS. 6a and 6b show enlarged schematic cross-sections of alternative embodiments of the inventive rear-projection screen capable of being mounted to the surface of a planar transparent rigid substrate or between two planar transparent rigid substrates. In FIG. 6a, screen 70 includes a light-diffusive film 31 affixed to a first side of rigid substrate 51 via a transparent pressure sensitive adhesive 45 and a light-absorption layer 33 affixed to the opposite second side of rigid substrate 51 via a second transparent pressure sensitive adhesive 46. In FIG. 6b, screen 80 is adapted to be mounted between two planar transparent rigid substrates 52 and 53. As depicted, screen 80 is substantially identical to screen 70 and further comprises a third transparent pressure sensitive adhesive 47 disposed between the second surface 33b of light-absorption film 33 and rigid substrate 53, and a fourth transparent pressure sensitive adhesive 48 disposed between rigid substrate 52 and the first surface 31a of light-diffusive film 31. It is contemplated that transparent pressure sensitive adhesives 45, 46, 47 and 48 may be the same or different transparent pressure sensitive adhesives. It is further contemplated that transparent pressure sensitive adhesives 45, 46, 47 and 48 may be applied as a coating over an entire surface of a film or substrate or portions thereof, or as individual spots on a surface of the film or substrate.

Figure 7:
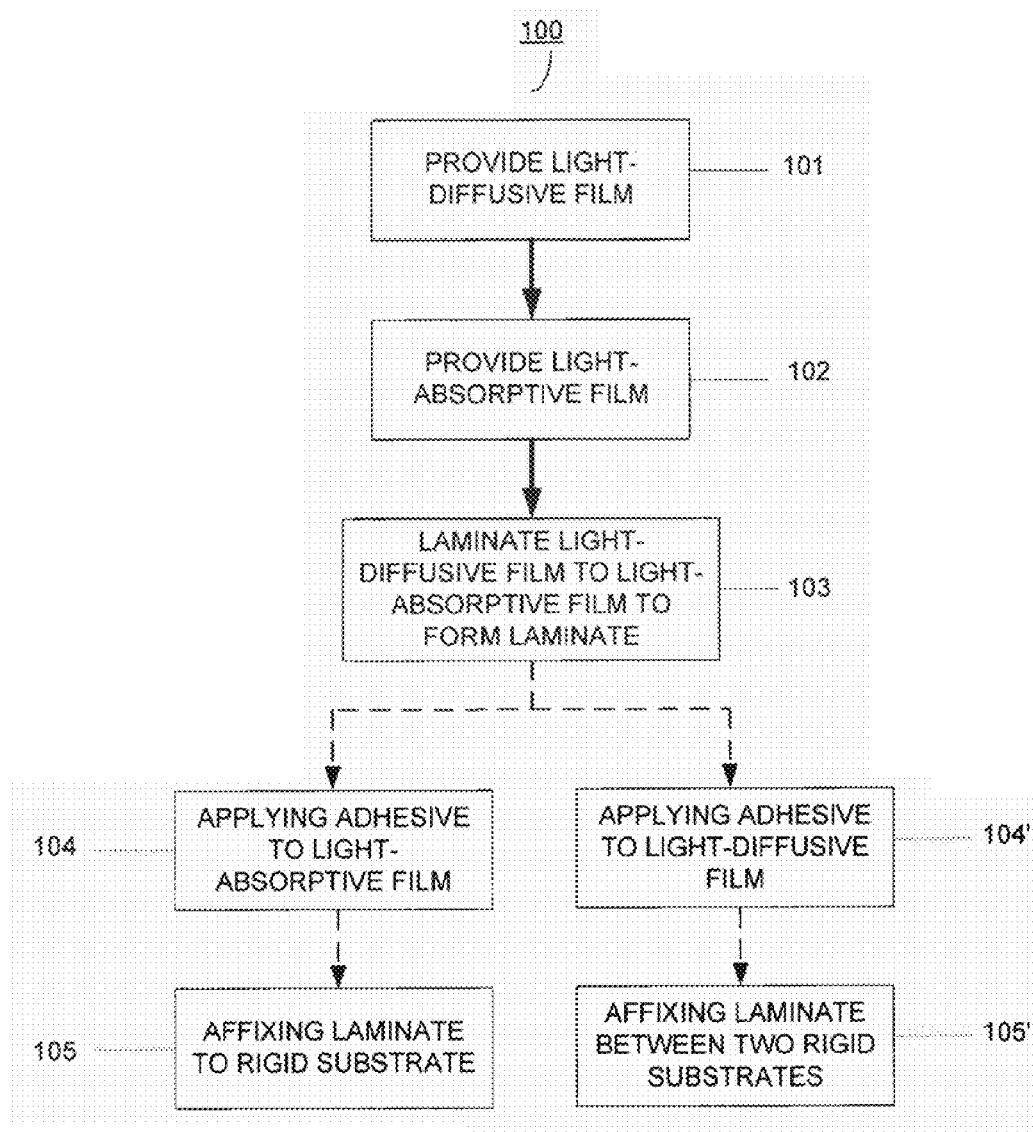
FIG. 7 is a flow diagram illustrating a method of forming a rear-projection screen in accordance with embodiments depicted in FIGS. 5a and 5b.

Turning now to FIG. 7, a flowchart 100 depicts one technique for creating a rear-projection screen in accordance with embodiments depicted in FIGS. 5a and 5b. In this embodiment, the following steps are contemplated in this order:

Step 101, providing a light-diffusive flexible first film having a substantially smooth first surface and an opposing substantially smooth second surface, whereby the light-diffusive film exhibits a visible light transmittance of between 60 to 80%, a visible light absorbance of between 0 to 15% and is both wax-free and lens-free;

Step 102, providing a light-absorptive flexible second film having a first surface and an opposing second surface, whereby the light-absorptive film exhibits a visible light transmittance of between 35 to 60% and a visible light absorbance of between 40 to 60%;

Step 103, laminating said second surface of the light-diffusive film to the first surface of the light-absorptive film to form a laminate, whereby the laminate exhibits a visible light transmittance of between 25 to 50% and a visible light absorbance of between 35 to 60%.

After step 103, this method for creating a rear-projection screen may further include the following optional steps as indicated by the dashed-line arrows:

Step 104, applying a transparent pressure sensitive adhesive to said second surface of the light-diffusive film, and Step 105, affixing the laminate to a planar transparent rigid substrate such that the adhesive is positioned between the laminate and the substrate, and the light-diffusive film is in direct contact with the light-absorptive film.

Alternatively after step 103, this method for creating a rear-projection screen may further include the following optional steps of:

Step 104', applying a transparent pressure sensitive adhesive to the first surface of the light-diffusive film, and Step 105', affixing the laminate to and between a first planar transparent rigid substrate and to a second planar transparent rigid substrate, such that the light-diffusive film is in direct contact with the light-absorptive film.

Figure 8:
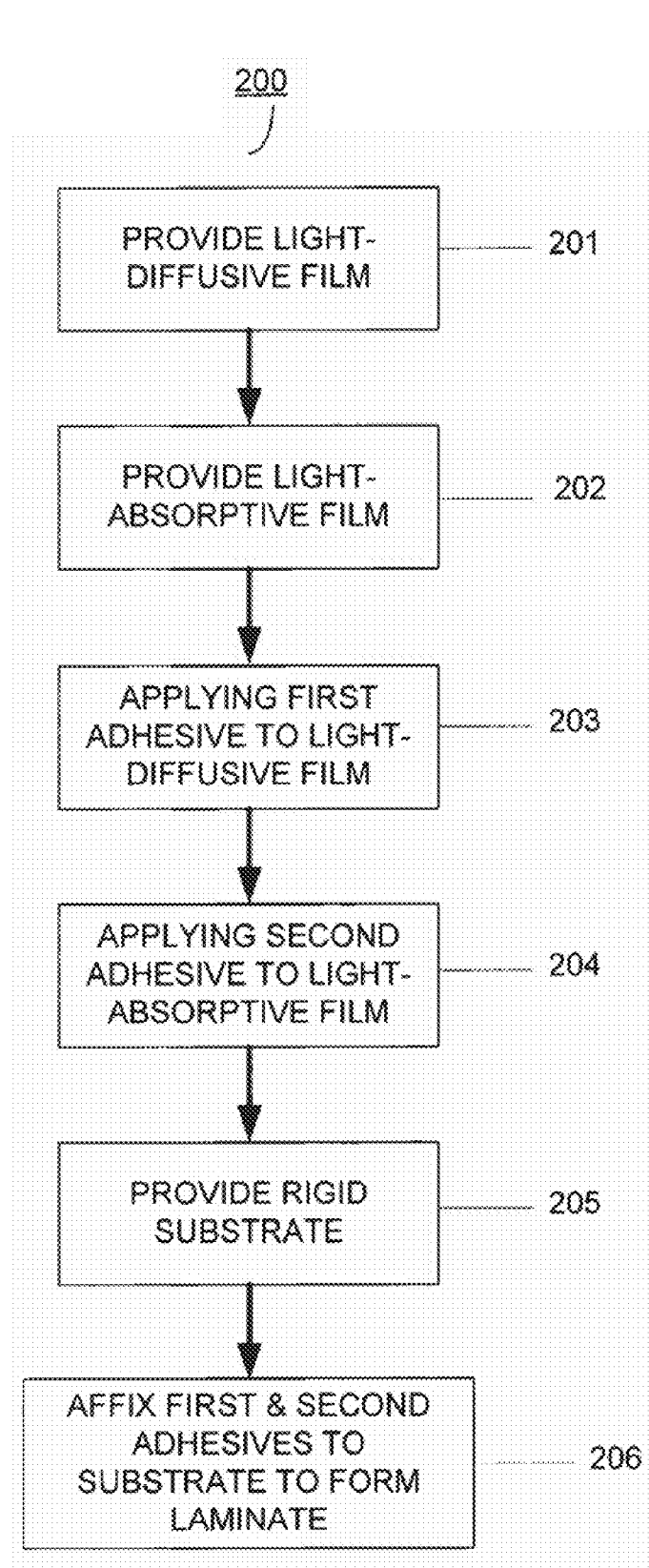
FIG. 8 is a flow diagram illustrating a method of forming a rear-projection screen in accordance with embodiments depicted in FIGS. 6a and 6b

Turning now to FIG. 8, a flowchart 200 depicts one technique for creating a rear-projection screen in accordance with the embodiment depicted in FIG. 6a. In this embodiment, the following steps are contemplated in this order:

Step 201, providing a light-diffusive flexible film having a substantially smooth first surface and an opposing substantially smooth second surface, whereby the light-diffusive film exhibits a visible light transmittance of between 60 to 80%, a visible light absorbance of between 0 to 15% and is both wax-free and lens-free;

Step 202, providing a light-absorptive flexible second film having a first surface and an opposing second surface; whereby light-absorptive film exhibits a visible light transmittance of between 35 to 60% and a visible light absorbance of between 40 to 60%;

Step 203, applying a transparent pressure sensitive first adhesive to the second surface of the light-diffusive film;

Step 204, applying a transparent pressure sensitive second adhesive to the first surface of the light-absorptive film:

Step 205, providing a planar transparent rigid substrate having a first surface and an opposing second surface; and Step 206, affixing the first adhesive to the first surface of the substrate and affixing the second adhesive to the second surface of the substrate to form a laminate; such that the laminate exhibits a visible light transmittance of between 25 to 50% and a visible light absorbance of between 35 to 55%.

Figure 9:
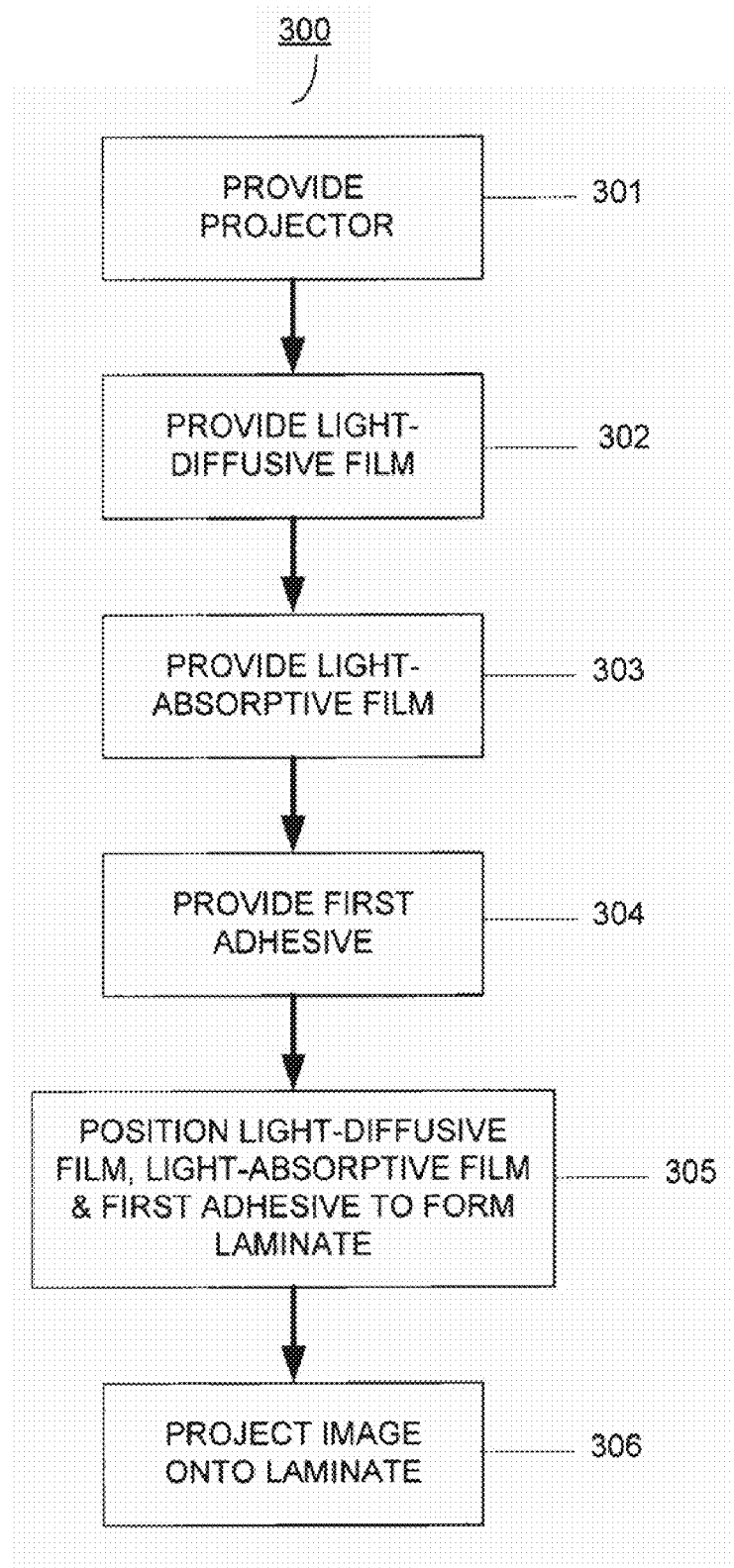
FIG. 9 is a flow diagram illustrating a method of displaying visual information onto a window.

Turning now to FIG. 9, a flowchart 300 depicts one method for displaying a projected image onto a window with the use of a rear-projection screen in accordance with the present invention. In this embodiment, the following steps are contemplated in this order:

Step 301, providing a projector for presenting an image;

Step 302, providing a lens-free flexible light-diffusive first film having a substantially smooth first surface and an opposing substantially smooth second surface, wherein the light-diffusive film comprises a wax-free amorphous thermoplastic matrix selected from the group consisting of polyvinyl chloride, polyester and polyolefin, a plurality of inorganic light-diffusing particles dispersed therein in an amount of between 15 to 20% by weight relative to the entire weight of the film and a plurality of metallic light-diffusing particles dispersed therein in an amount of between 0 to 1.0% by weight relative to the entire weight of the film;

Step 303, providing an opposing light-absorptive flexible second film having a first surface and an opposing second surface, and comprising a thermoplastic matrix selected from the group consisting of polyvinyl chloride, polyester and polyolefin; and a plurality of light-absorbing colorant particles dispersed therein in an amount of between 0.05 to 0.5% by weight relative to the entire weight of the film;

Step 304, providing a transparent pressure sensitive first adhesive:

Step 305, positioning the light-diffusive film, the light-absorptive film, the first adhesive on a window to form a laminate such that either:

i) said first surface of the light-absorptive film is in direct contact with the second surface of light-diffusive film and the second surface of the light-absorptive film is in direct contact with the first adhesive, and the first adhesive is in contact with an interior surface of the window; or ii) the first adhesive is in direct contact with both said second surface of the light-diffusive film and an interior surface of the window, and a second transparent pressure sensitive adhesive is in direct contact With both the first surface of the light-absorptive film and an exterior surface of the window; and Step 306, projecting an image from the projector onto the laminate such that the image enters the first surface of the light-diffusive film and exits the second surface of the light-absorptive film; such that the laminate exhibits a visible light transmittance of between 25 to 50% and a visible light absorbance of between 35 to 55%.

The following Examples illustrate various aspects of the present invention. It is to be understood that the present invention is defined by the appended claims and not specific details of the Examples.

REAR-PROJECTION SCREEN EXAMPLES

Comparative Example 1

Comparative example 1 was a light-diffusive film similar to the one described in FIG. 1. The light-diffusive film was a MACal® Glass Décor 700 film obtained from MACtac Europe SA which included a translucent monolayer film having amorphous polyvinyl chloride matrix with between 15 to 20% by weight relative to the entire weight the film of barium sulfate particles and between 0.4 to 0.8% by weight relative to the entire weight the film of aluminum particles each incorporated and dispersed therein. The film had an approximate overall thickness of about 75 to 80 microns.

Comparative Example 2

Comparative example 2 was a monolayer light-diffusive film identical to that described for Comparative Example 1, except that about 0.2% by weight relative to the entire weight the film of carbon black was incorporated into the polyvinyl chloride matrix.

Comparative Example 3

Comparative example 3 was a monolayer light-absorptive film similar to the one described in FIG. 2. In this example, the light-absorptive film consisted of a polyethylene terephthalate matrix having 0.2% by weight relative to the entire weight the film of carbon black incorporated therein.

Comparative Example 4

Comparative example 4 was similar to Comparative Example 3, except for an extra light-absorptive film having a identical composition was added. The two light-absorptive films were fused together by heat and pressure to form a two-ply laminate.

Comparative Example 5

Comparative example 5 was a monolayer light-absorptive film similar to the one described in FIG. 2. The light-absorptive film consisted of a polyvinyl chloride matrix with about 0.2% by weight relative to the entire weight the film of carbon black incorporated therein.

Example 1

Example 1 included a light-diffusive film and a light-absorptive film similar to the laminate described in FIG. 3. The light-diffusive film was identical to that described for Comparative Example 1. The light-absorptive film was a transparent monolayer film having a matrix of amorphous polyethylene terephthalate and about 0.2% by weight relative to the entire weight of the film of carbon black incorporated therein. The light-diffusive and light-absorptive films were adhesively laminated together by use of a transparent acrylic pressure sensitive adhesive to form a two-ply laminate.

Example 2

Example 2 was similar to Example 1, except that an extra light-absorptive film having an identical composition as that described in Example 1 was added. The light-diffusive and light-absorptive films were fused together by heat and pressure form a three-ply laminate.

Example 3

Example 3 was similar to Example 2, except that an extra light-absorptive film having an identical composition as that described in Example 1 was added. The light-diffusive film and light-absorptive films were fused together by heat and pressure form a four-ply laminate.

Example 4

Example 4 was similar to Example 1, except for the light-absorptive film was a transparent monolayer film having a matrix of amorphous polyvinyl chloride with between 0.05 to 0.3% by weight relative to the entire weight of film of carbon black incorporated therein. The light-diffusive and light-absorptive films were fused together by heat and pressure to form a two-ply laminate.

Example 5

Example 5 was identical to Example 4, except that the laminate was mounted onto a 4 mm pane of glass similar to that described in FIG. 5a.

Table 1 illustrates the various spectral properties of the rear-projection screens described above for Comparative Examples 1, 2, 3, 4 and 5, and Examples 1, 2, 3, 4, and 5. Prior to measuring the spectral properties, a layer of pressure sensitive adhesive applied to the surface of each screen. It will be understood that the spectral properties were measured in accordance with European Norm EN 410.

TABLE 1

|  | VISIBLE LIGHT TRANSMITTED | VISIBLE LIGHT REFLECTED | VISIBLE LIGHT ABSORBED | TOTAL SOLAR ENERGY TRANSMITTED |
|---|---|---|---|---|
| COMPARATIVE EXAMPLE 1 | 69% | 24% | 7% | 67% |
| COMPARATIVE EXAMPLE 2 | 32% | 17% | 51% | 31% |
| COMPARATIVE EXAMPLE 3 | 43% | 8% | 49% | 49% |
| COMPARATIVE EXAMPLE 4 | 20% | 7% | 73% | 29% |
| COMPARATIVE EXAMPLE 5 | 43% | 6% | 51% | 41% |
| EXAMPLE 1 | 31% | 21% | 48% | 36% |
| EXAMPLE 2 | 15% | 21% | 64% | 22% |
| EXAMPLE 3 | 7% | 20% | 73% | 14% |
| EXAMPLE 4 | 36% | 18% | 46% | 34% |
| EXAMPLE 5 | 35% | 17% | 48% | 31% |

It will be apparent to those skilled in the art that modifications and additions can be made to the various embodiments described above, without departing from the true scope and spirit of the present invention. It should be understood that this invention is not intended to be unduly limited by the illustrative embodiments set forth herein and that such embodiments are presented by way of example only with the scope of the invention intended to be limited only by the claims set forth herein as follows.

What is claimed is:

1. A rear-projection screen comprising:
   a) a flexible light-diffusive first film having a substantially smooth first surface and an opposing substantially smooth second surface, and comprising a wax-free amorphous thermoplastic matrix having a plurality of light-diffusing particles dispersed therein and which is lens-free; and b) an opposing flexible light-absorption second film having a first surface and an opposing second surface, and comprising a thermoplastic matrix having a plurality of light-absorbing particles dispersed therein;

wherein said screen exhibits a visible light transmittance of between 25 to 50% and visible light absorbance of between 35 to 55%;

wherein said screen exhibits a visible light reflectance of between 0 to 25%.

2. A projection screen according to claim 1, wherein said first film exhibits a visible light transmittance of between 60 to 80%.

3. A projection screen according to claim 1, wherein said first film exhibits a visible light absorbance of between 0 to 15%.

4. A projection screen according to claim 1, wherein said second film exhibits a visible light transmittance of between 35 to 60%.

5. A projection screen according to claim 1, wherein said second film exhibits a visible light absorbance of between 40 to 60%.

6. A projection screen according to claim 1, wherein said first surface of said second film is in direct contact with said second surface of said first film.

7. A projection screen according to claim 1, further comprising a transparent pressure sensitive first adhesive.

8. A projection screen according to claim 7, wherein said first adhesive is in direct contact with said second surface of said second film.

9. A projection screen according to claim 8, wherein said screen is affixed to a planar transparent rigid substrate such that said first adhesive is positioned between said first film and said substrate, and said first film is in direct contact with said second film.

10. A projection screen according to claim 9, wherein said screen is positioned between said first substrate and a planar transparent rigid second substrate, and said first film is in direct contact with said second film.

11. A projection screen according to claim 7, further comprising a transparent pressure sensitive second adhesive in direct contact with said first surface of said first film.

12. A projection screen according to claim 10, wherein said second adhesive is an acrylic-based pressure sensitive adhesive.

13. A projection screen according to claim 7, wherein said first adhesive is in direct contact with said second surface of said first film and positioned between said first film and said second film.

14. A projection screen according to claim 13, further comprising a transparent pressure sensitive second adhesive in direct contact with said first surface of said second film.

15. A projection screen according to claim 14, wherein said screen is affixed to a planar transparent rigid substrate such that substrate is positioned between and in direct contact with said first and second adhesives.

16. A projection screen according to claim 7, wherein said first adhesive is an acrylic-based pressure sensitive adhesive.

17. A projection screen according to claim 7, further comprising a release liner in direct contact with said pressure sensitive adhesive.

18. A projection screen according to claim 1, wherein said thermoplastic matrix comprises a polymer selected from the group consisting of polyvinyl chloride, polyester and polyolefin.

19. A projection screen according to claim 18, wherein said polymer is polyvinyl chloride.

20. A projection screen according to claim 1, wherein said light-diffusing particles comprise organic, inorganic, metallic light-diffusing particles or combinations thereof.

21. A projection screen according to claim 1, wherein said light-diffusing particles are inorganic light-diffusing particles.

22. A projection screen according to claim 21, wherein said inorganic light-diffusing particles comprise barium sulfate.

23. A projection screen according to claim 22, wherein said barium sulfate is present in an amount of between 15 to 20% by weight relative to the entire weight of said first film.

24. A projection screen according to claim 1, wherein said light-diffusing particles comprise both inorganic and metallic light-diffusing particles.

25. A projection screen according to claim 24, wherein said metallic light-diffusing particles comprise aluminum.

26. A projection screen according to claim 25, wherein said aluminum is present in an amount of between 0 to 1.0% by weight relative to the entire weight of said first film.

27. A projection screen according to claim 26, wherein said aluminum is present in an amount of between 0.4 to 0.8% by weight relative to the entire weight of said first film.

28. A projection screen according to claim 1, wherein said light-absorbing particles comprise a colorant.

29. A projection screen according to claim 1, wherein said colorant comprises carbon black.

30. A projection screen according to claim 29, wherein said carbon black is present in an amount of between 0.05 to 0.5% by weight relative to the entire weight of said second film.

31. A projection screen according to claim 30, wherein said carbon black is present in an amount of between 0.05 to 0.3% by weight relative to the entire weight of said second film.

32. A projection screen according to claim 1, wherein said screen exhibits a total solar energy transmittance of between 25 to 45%.

33. A projection screen according to claim 1, wherein said screen is flexible.

34. A rear-projection screen comprising:

a) a flexible light-diffusive first film having a substantially smooth first surface and an opposing substantially smooth second surface, and comprising a wax-free amorphous thermoplastic matrix selected from the group consisting of polyvinyl chloride, polyester and polyolefin, a plurality of inorganic light-diffusing particles dispersed therein in an amount of between 15 to 20% by weight relative to the entire weight of said first film and a plurality of light-diffusing metallic particles dispersed therein in an amount of between 0 to 1.0% by weight relative to the entire weight of said first film; wherein said first layer is lens-free;

b) an opposing light-absorptive flexible second film having a first surface and an opposing second surface, and comprising a thermoplastic matrix selected from the group consisting of polyvinyl chloride, polyester and polyolefin; and a plurality of light-absorbing colorant particles dispersed therein in an amount of between 0.05 to 0.5% by weight relative to the entire weight of said second film; wherein said first surface of said second film is in direct contact with said second surface of said first film; and c) a transparent pressure sensitive first adhesive in direct contact with said second surface of said second film;

d) a transparent pressure sensitive second adhesive in direct contact with said first surface of said first film;

wherein said screen exhibits a visible light transmittance of between 25 to 50% and a visible light absorbance of between 35 to 55%;

wherein said screen is positioned between a planar transparent rigid first substrate and a planar transparent rigid second substrate, and said first film is in direct contact with said second film.

35. A projection screen according to claim 34, wherein said thermoplastic matrix is polyvinyl chloride.

36. A projection screen according to claim 34, wherein said metallic light-diffusing particles is present in an amount of between 0.4 to 0.8% by weight relative to the entire weight of said first film.

37. A projection screen according to claim 34, wherein said inorganic light-diffusing particles are barium sulfate.

38. A projection screen according to claim 34, wherein said metallic light-diffusing particles are aluminum.

39. A projection screen according to claim 34, wherein said light-absorbing colorant particles are carbon black.

40. A projection screen according to claim 39, wherein said carbon black is present in an amount of between 0.05 to 0.3% by weight relative to the entire weight of said second film.

41. A projection screen according to claim 34, wherein said first film exhibits a visible light transmittance of between 60 to 80%.

42. A projection screen according to claim 34, wherein said first film exhibits a visible light absorbance of between 0 to 15%.

43. A projection screen according to claim 34, wherein said second film exhibits a visible light transmittance of between 35 to 60%.

44. A projection screen according to claim 34, wherein said second film exhibits a visible light absorbance of between 40 to 60%.

45. A projection screen according to claim 34, wherein said screen exhibits a visible light reflectance of between 10 to 25%.

46. A projection screen according to claim 34, wherein said screen exhibits a total solar energy transmittance of between 25 to 45%.

47. A projection screen according to claim 34, wherein said screen is flexible.

48. A projection screen according to claim 34, wherein said screen is affixed to a planar transparent rigid substrate such that said adhesive is position between said second film and said substrate.

49. A rear-projection screen comprising:

a) a flexible light-diffusive first film having a substantially smooth first surface and an opposing substantially smooth second surface, and comprising a wax-free amorphous thermoplastic matrix selected from the group consisting of polyvinyl chloride, polyester and polyolefin, a plurality of inorganic light-diffusing particles dispersed therein in an amount of between 15 to 20% by weight relative to the entire weight of said first film and a plurality of metallic light-diffusing particles dispersed therein in an amount of between 0 to 1.0% by weight relative to the entire weight of said first film; wherein said first layer is lens-free;

b) an opposing light-absorptive flexible second film having a first surface and an opposing second surface, and comprising a thermoplastic matrix selected from the group consisting of polyvinyl chloride, polyester and polyolefin; and a plurality of light-absorbing colorant particles dispersed therein in an amount of between 0.05 to 0.5% by weight relative to the entire weight of said second film;

c) a transparent pressure sensitive first adhesive in direct contact with said second surface of said first film and positioned between said first film and said second film; and d) a transparent pressure sensitive second adhesive in direct contact with said first surface of said second film and positioned between said first film and said second film;

wherein said screen exhibits a visible light transmittance of between 25 to 50%, and a visible light absorbance of between 35 to 55%;

wherein said screen exhibits a visible light reflectance of between 0 to 25%.

50. A projection screen according to claim 49, wherein said thermoplastic matrix is polyvinyl chloride.

51. A projection screen according to claim 49, wherein said metallic light-diffusing particles is present in an amount of between 0.4 to 0.8% by weight relative to the entire weight of said first film.

52. A projection screen according to claim 49, wherein said inorganic light-diffusing particles are barium sulfate.

53. A projection screen according to claim 49, wherein said metallic light-diffusing particles are aluminum.

54. A projection screen according to claim 49, wherein said light-absorbing colorant particles are carbon black.

55. A projection screen according to claim 54, wherein said carbon black is present in an amount of between 0.05 to 0.3% by weight relative to the entire weight of said second film.

56. A projection screen according to claim 49, wherein said first film exhibits a visible light transmittance of between 60 to 80%.

57. A projection screen according to claim 49, wherein said first film exhibits a visible light absorbance of between 0 to 15%.

58. A projection screen according to claim 49, wherein said second film exhibits a visible light transmittance of between 35 to 60%.

59. A projection screen according to claim 49, wherein said second film exhibits a visible light absorbance of between 40 to 60%.

60. A projection screen according to claim 49, wherein said screen exhibits a total solar energy transmittance of between 25 to 45%.

61. A projection screen according to claim 49, wherein said screen is flexible.

62. A projection screen according to claim 49, wherein said screen is affixed to a planar transparent rigid substrate such that substrate is positioned between said first adhesive and said second adhesive.

63. A method for forming a rear-projection screen comprising:

a) providing a light-diffusive flexible first film having a substantially smooth first surface and an opposing substantially smooth second surface, wherein said first film exhibits a visible light transmittance of between 60 to 80%, a visible light absorbance of between 0 to 15% which is both wax-free and lens-free;

b) providing a light-absorptive flexible second film having a first surface and an opposing second surface; wherein second film exhibits a visible light transmittance of between 35 to 60% and a visible light absorbance of between 40 to 60%; and c) laminating said second surface of said first film to said first surface of said second film to form a laminate;

d) applying a transparent pressure sensitive adhesive to said first surface of said first film;

e) affixing said laminate to and between a planar transparent rigid first substrate and to a planar transparent rigid second substrate, such that said first film is in direct contact with said second film;

wherein said laminate exhibits a visible light transmittance of between 25 to 50% and a visible light absorbance of between 35 to 60%.

64. A method according to claim 63; further comprising applying a transparent pressure sensitive adhesive to said second surface of said second film.

65. A method according to claim 64; further comprising affixing said laminate to a planar transparent rigid substrate such that said adhesive is positioned between said laminate and said substrate, and said first film is in direct contact with said second film.

66. A method according to claim 64, wherein said adhesive is an acrylic-based pressure sensitive adhesive.

67. A method according to claim 63; wherein said first film comprises an amorphous thermoplastic matrix selected from the group consisting of polyvinyl chloride, polyester and polyolefin, a plurality of inorganic light-diffusing particles dispersed therein in an amount of between 15 to 20% by weight relative to the entire weight of said first film and a plurality of light diffusing metallic particles dispersed therein in an amount of between 0 to 1.0% by weight relative to the entire weight of said first film.

68. A method according to claim 67, wherein said inorganic light-diffusing particles are barium sulfate.

69. A method according to claim 67, wherein said metallic light-diffusing particles are aluminum.

70. A method according to claim 63; wherein said second film comprises a thermoplastic matrix selected from the group consisting of polyvinyl chloride, polyester and polyolefin; and a plurality of light-absorbing colorant particles dispersed therein in an amount of between 0.05 to 0.5% by weight relative to the entire weight of said second film.

71. A method according to claim 70, wherein said light-absorbing colorant particles are carbon black.

72. A method according to claim 67 or 70; wherein said thermoplastic matrix is polyvinyl chloride.

73. A method for displaying a projected image onto a window, comprising:
a) providing a projector for presenting said image;
b) providing a lens-free flexible light-diffusive first film having a substantially smooth first surface and an opposing substantially smooth second surface, and comprising a wax-free amorphous thermoplastic matrix selected from the group consisting of polyvinyl chloride, polyester and polyolefin, a plurality of inorganic light-diffusing particles dispersed therein in an amount of between 15 to 20% by weight relative to the entire weight of said first film and a plurality of metallic light-diffusing particles dispersed therein in an amount of between 0 to 1.0% by weight relative to the entire weight of said first film;
c) providing an opposing light-absorptive flexible second film having a first surface and an opposing second surface, and comprising a thermoplastic matrix selected from the group consisting of polyvinyl chloride, polyester and polyolefin; and a plurality of light-absorbing colorant particles dispersed therein in an amount of between 0.05 to 0.5% by weight relative to the entire weight of said second film;
d) providing a transparent pressure sensitive first adhesive:
e) positioning said first film, said second film, said first adhesive on said window to form a laminate such that either:
  i) said first surface of said second film is in direct contact with said second surface of said first film and said second surface of said second film is in direct contact with said first adhesive, and said first adhesive is in contact with an interior surface of said window; or
  ii) said first adhesive is in direct contact with both said second surface of said first film and an interior surface of said window, and a transparent pressure sensitive second adhesive is in direct contact with both said first surface of said second film and an exterior surface of said window; and
g) projecting said image from said projector onto said laminate such that said image enters said first surface of said first film and exits said second surface of said second film;

wherein said laminate exhibits a visible light transmittance of between 25 to 50% and a visible light absorbance of between 35 to 55%;

wherein said laminate exhibits a visible light reflectance of between 0 to 25%.

74. A method according to claim 73, wherein said thermoplastic matrix is polyvinyl chloride.

75. A method according to claim 73, wherein said metallic light-diffusing particles is present in an amount of between 0.4 to 0.8% by weight relative to the entire weight of said first film.

76. A method according to claim 73, wherein said inorganic light-diffusing particles are barium sulfate.

77. A method according to claim 73, wherein said metallic light-diffusing particles are aluminum.

78. A method according to claim 73, wherein said light-absorbing colorant particles are carbon black.

79. A method according to claim 78; wherein carbon black is present in an amount of between 0.05 to 0.3% by weight relative to the entire weight of said second film.

80. A method according to claim 73; wherein said first film exhibits a visible light transmittance of between 60 to 80% and a visible light absorbance of between 0 to 15%.

81. A method according to claim 73; wherein said second film exhibits a visible light transmittance of between 35 to 60% and a visible light absorbance of between 40 to 60%.

82. A method according to claim 73; wherein said laminate exhibits a visible light transmittance of between 25 to 50% and a visible light absorbance of between 35 to 60%.

83. A method according to claim 73; wherein said laminate exhibits a total solar energy transmittance of between 25 to 45%.

* * * * *